United States Patent
Werner

Patent Number: 5,462,358
Date of Patent: Oct. 31, 1995

[54] SELECTIVELY EXTRACTING INFRARED RADIATION FROM BIOLER INTERIOR TO DETERMINE THE TEMPERATURE OF INDIVIDUAL BOILER TUBES

[75] Inventor: Walter V. Werner, Sparta, N.J.

[73] Assignee: AT&T IPM Corp., Coral Gables, Fla.

[21] Appl. No.: 176,757

[22] Filed: Jan. 3, 1994

[51] Int. Cl.⁶ .................. G01J 5/08; G01K 1/14; F22B 37/42

[52] U.S. Cl. .......... 374/124; 122/6 A; 122/504; 374/131; 374/141

[58] Field of Search .................. 374/124, 141, 374/131; 250/338.1; 122/504, 6 A; 431/78, 79, 80; 110/190

[56] References Cited

U.S. PATENT DOCUMENTS

| | | | |
|---|---|---|---|
| 4,539,588 | 9/1985 | Ariessohn et al. | 374/124 |
| 4,566,808 | 1/1986 | Pompei et al. | 374/124 |
| 4,666,245 | 5/1987 | Pointer | 374/131 |
| 4,998,826 | 3/1991 | Wood et al. | 374/124 |
| 5,164,999 | 11/1992 | Shifflett | 374/131 |
| 5,232,285 | 8/1993 | Mannik | 374/131 |
| 5,355,845 | 10/1994 | Burgess et al. | 122/504 |

FOREIGN PATENT DOCUMENTS

| | | | |
|---|---|---|---|
| 0147635 | 9/1983 | Japan | 374/124 |
| 0179034 | 2/1966 | U.S.S.R. | 374/124 |
| 1582889 | 1/1981 | United Kingdom | 374/124 |

*Primary Examiner*—Diego F. F. Gutierrez
*Attorney, Agent, or Firm*—Charles E. Graves; Martin I. Finston

[57] ABSTRACT

Surface temperature measurements of the tubes of operating power boilers are facilitated by using ganged and preferably scannable hollow-core sapphire probes to capture infrared radiation emanating from discrete tube surface areas. By selectively overlapping the tube surface areas scanned, the greater diameter of the scanning beam in relation to the tube diameter is compensated for and individual tubes can be assessed for surface temperature. Multiplexing the outputs of many probes to a remote signal processor which also controls the scanning regimens provides systematic automated temperature readings.

4 Claims, 3 Drawing Sheets

TEMPERATURE °C x 10000

SELECTIVELY EXTRACTING INFRARED RADIATION FROM BIOLER INTERIOR TO DETERMINE THE TEMPERATURE OF INDIVIDUAL BOILER TUBES

FIELD OF THE INVENTION

This invention relates to measurement of surface temperatures of exterior surfaces of boiler tubes in operation in power generation boilers and, more particularly, to the efficient extraction of infrared energy radiating from tube surfaces in a form sufficient to permit accurate temperature estimations of tube surfaces.

BACKGROUND OF THE INVENTION

In U.S. Pat. No. 5,355,845 of J. J. Burgess et al., which is hereby incorporated by reference, there is described the realization that passbands in the radiation/absorption spectra exist in the infrared region for the combustion gasses typically present in gas-fired power generating boilers. The passbands enable infrared emissions from heated surfaces of the boiler tubes to travel through the gasses for substantial distances. The energy in these passbands may be detected and measured, and used to estimate the surface temperature of the steam tubes. The temperature history in turn affords an otherwise unavailable measure of the remaining useful life of the tube and, hence, the timing of boiler tube replacement activity.

The detecting of the infrared energy is made generally possible by employing a hollow-core sapphire waveguide or the functional equivalent which functions at the high temperatures of the flue gasses, and advantageously provides a suitably narrow acceptance angle, thus enabling emitted infrared energy to be detected from a discrete region. The discrete region may be as small as a 19-inch diameter circle when the fiber tip is placed 30 or so feet from the tube surface to be monitored.

The utility of the sapphire device or its equivalents is not readily achieved, however, unless the devices can be deployed in optimal ways in the boiler so as to minimize the number of devices and their intrusion into the boiler.

SUMMARY OF THE INVENTION

It has been realized that there are preferred approaches to using the hollow-core sapphire probe or its equivalent in the environment described to enable highly advantageous selective capturing of infrared radiation emanating from tube surfaces at elevated temperatures. Part of the inventive approach is to take advantage of the rod-like stiffness of a hollow-core sapphire fiber probe at elevated temperatures of an operating boiler by combining it with means for effectively pointing the rod end at selected areas of the tube surfaces.

In a particular embodiment, the hollow-core surface fiber is successively directed to discrete tube surface areas which physically overlap in a pre-determined amount. The radiation measurements then later are processed to enable precise estimates to be made of tube surface temperatures virtually throughout the interior of the boiler.

DETAILED DESCRIPTION OF AN ILLUSTRATIVE EMBODIMENT

Figure 1:
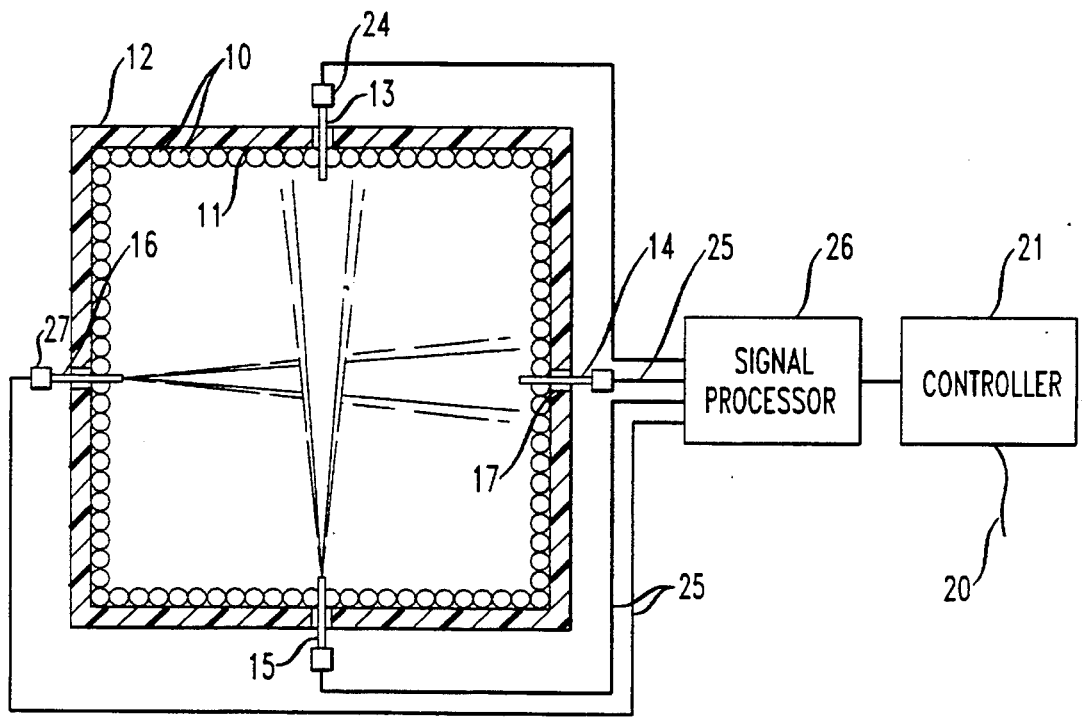
FIG. 1 is a top cross-sectional view of a boiler, showing probe locations and data processing means.

As seen in FIG. 1, typical power generation boilers are constituted of arrays of rectangularly stacked vertical steel tubes denoted 10, each tube being 4–5 inches in outside diameter. The tubes 10 typically are welded together in side-by-side relation, and mounted on the interior walls 11 of a firebox 12. The tubes and the furnace firebox can be 12–15 stories in height; and accordingly the tube surface area for which temperature measurements are desired has substantial vertical as well as horizontal aspects.

The furnace fire walls typically have ports, such as ports 13, formed in the walls to enable visual monitoring and inspection. The ports may be left open even during boiler operation and provide available places into which to mount the detector apparatus. FIG. 1 shows four infrared probes 13, 14, 15, and 16 each disposed through a port 17. Ports such as 17 are located at approximately every story and therefore as many as 50–100 probes may be so disposed through ports.

Figure 2:
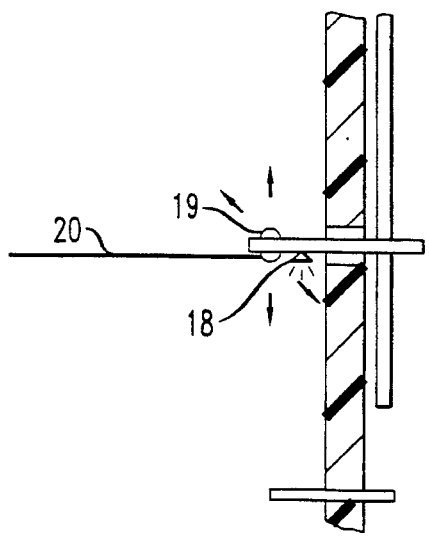
FIG. 2 is a side-view sketch of a probe mounted for scanning.

Given the height of the boiler, even this number of probes if fixedly mounted, do not provide adequate coverage of the tube surfaces. Accordingly, as seen in FIG. 2, each probe may be mounted on a fixed 2-directional hinge 18 and scanned by a controlled driver 19 which may be a conventional X-Y stage micropositioner. The scan control for each micropositioner is effected by connections from a micropositioner through line 20 to a controller 21, as illustrated in FIGS. 1 and 2.

Figure 3:
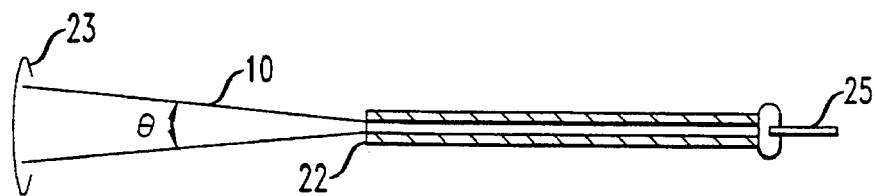
FIG. 3 is a sectional side view of a mounted probe illustrating its acceptance angle.

The hollow-core sapphire probe typically is about a foot in length and is rigid even at the flue gas temperatures, which allows for accurate pointing. The output of each of the 50-odd probes is connected to a conventional optical fiber 25 as seen in FIG. 3, which is fused to the outer end of the probe. The fiber 25 end can be bevelled in order to reduce the magnitude of the reflected signal at the sapphire probe/optical fiber interface.

Referring to FIG. 3, the cone acceptance angle of a hollow-core sapphire probe of length 125 centimeters outside diameter 580 microns and hollow-core diameter 380 microns is usually about 3 degrees as indicated by the angle denoted θ. If the probe tip 22 is about 30 feet from the tube surface 23, then the area "scanned" by the beam's end is 19.5 inches in diameter.

Figure 4:
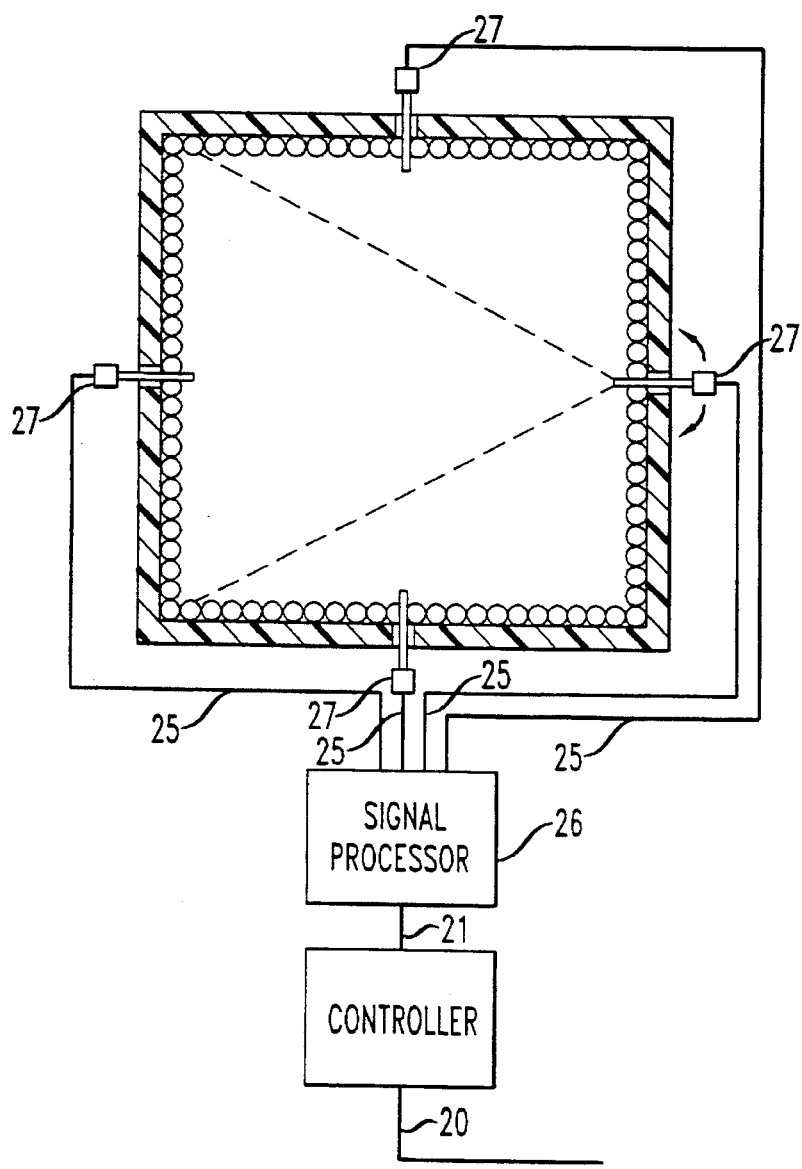
FIG. 4 is a rendering similar to FIG. 1, showing the ability of probe scanning means to enlarge the field of purview.

As seen in FIG. 1, the acceptance angle of a non-scanned probe is seen to be fairly minimal. By providing scanning capability, the probe's viewing range may be extended to the entirety of the opposite wall as illustrated in FIG. 4.

Figure 5:
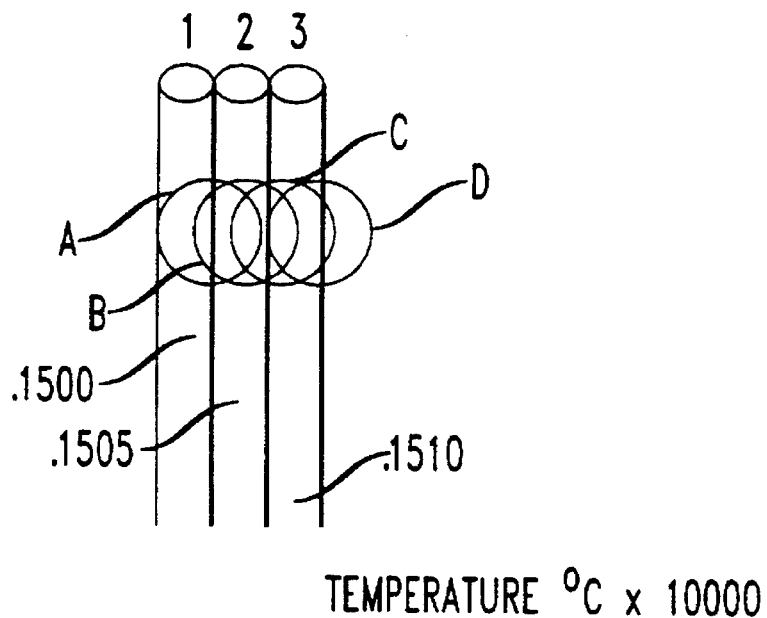
FIG. 5 is a sketch showing one scheme for overlap-scanning of a given probe.

Measurements of infrared radiation are most advantageously made by stepping each probe to a stop position for a period which can be less than one second and taking a reading of the probe output. FIG. 5 illustrates several adjacent tubes which are shown to be at different but unknown temperatures which must be determined. Because the tube diameters are significantly less than the area "scanned" by a stationary probe, a given fixed "scan" such as scan a embraces 2–3 tubes or more. By stepping the probe to successive step positions, several further "scans" b, c, and d are made which overlap. The stop distance between each successive scan should be as large as possible within the constraint that "N" independent scan measurements can be performed for scans that encompass "N" boiler tubes. The following example illustrates how the surface temperature of a particular single tube may be calculated. If a probe scans a circular area of diameter 20 inches and a hypothetical tube diameter is ten inches, then scan a could measure the average temperature for tubes # 1 and #2, as portrayed by FIG. 5. By stepping 5 inches, scan b would provide a measurement proportional to 22% of tube #1 temperature, 56% of the tube #2 temperature, and 22% of tube #3 temperature. Finally, scan c could provide the average temperatures of the respective sections of tubes #2 and #3. Since the number of scans (three) is less than the total number of tubes traversed by the scans, the mean temperature of a tube section can be determined.

Figure 6:
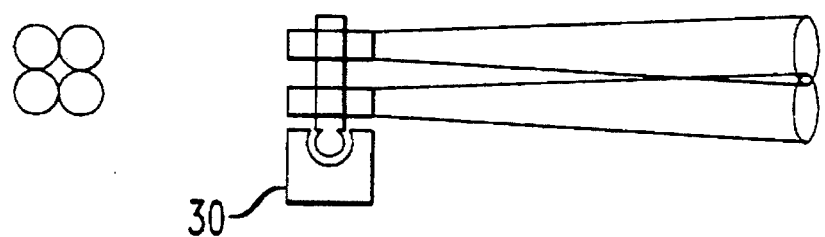
FIG. 6 is a sketch illustrating use of clusters of probes to provide overlapping images of tube surface regions while the cluster is stationary.

Several probes can be ganged in an array as illustrated in FIG. 6 where four probes are shown in a rectangular configuration, with means 30 for individually scanning the array. The scan areas of these four can be made to overlap as shown. The overlap may be by a fixed amount. An array provides more readings per scan stop and therefore faster reading of the entire tube area.

Returning to FIG. 1, the 50-odd collector fibers 25 may be connected to a signal processor 26. Processor 26 can provide either time division or wave division multiplexing of the signals from the individual collector fibers. If wave division multiplexing is used, it is necessary to provide filters 27 in the paths of each probe circuit to create distinct filter bands for each fiber path. In such a fashion, demultiplexing can be achieved by knowledge of the wavelength encoded passband associated with each collection fiber.

I claim:

1. For a power boiler comprising side-by-side arrays of boiler tubes disposed essentially flatly and vertically along rectangularly configured interior walls of a firebox flue, apparatus for receiving infrared radiation from inwardly-facing surfaces of said boiler tubes, the apparatus comprising:

a plurality of hollow-core waveguide infrared radiation-receiving probes mounted at fixed locations in said flue interior walls, each of said probes being rigid at flue gas temperatures and having a narrow-angle radiation acceptance cone;

fixedly mounted scanning means for directing the input end of each of said probes to point to inwardly-facing surfaces of boiler tubes that are disposed along an interior wall other than the wall through which said probe is mounted;

a remotely located signal processor; and means for extracting infrared energy from the output end of each of said probes and directing said energy to said signal processor, wherein:

the scanning means are adapted to step each probe to a plurality of predetermined stop positions;

the acceptance cone of each respective probe intercepts, at each stop position, at least two boiler tubes;

for each respective probe, the acceptance cone at each stop position overlaps the acceptance cone at adjacent stop positions;

for each respective probe, the total number of boiler tubes intercepted at all stop positions is less than or equal to the number of stop positions; and the signal processor comprises means for processing plural energy values, each said value representing energy collected from at least two boiler tubes, thereby to extract temperature values that are specific to individual boiler tubes.

2. Apparatus in accordance with claim 1, further comprising:

means for multiplexing signals from said probes into said signal processor; and means in said processor for extracting from said multiplexed signals temperature estimates of specific surface regions of individual ones of said tubes.

3. Apparatus in accordance with claim 2, further comprising means for ganging multiple ones of said probes into at least one array, and means for individually scanning each said array.

4. Apparatus in accordance with claim 3, wherein the scan areas of each individual probe within each of said probe arrays overlap by a fixed amount.

* * * * *